June 19, 1934.    W. M. BAILEY    1,963,607
FLOATING FOIL CAPACITOR
Filed Aug. 8, 1930
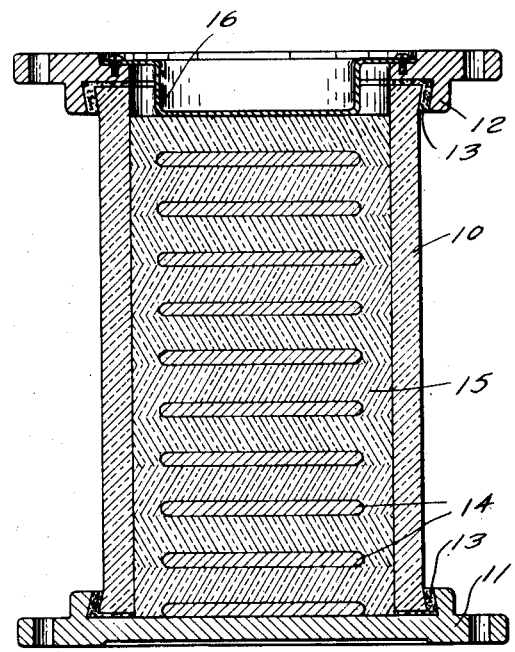
Inventor:
William M. Bailey
By his Attorney Patented June 19, 1934

1,963,607

UNITED STATES PATENT OFFICE 1,963,607

FLOATING FOIL CAPACITOR

William M. Bailey, Lynn, Mass., assignor, by mesne assignments, to General Electric Company, a corporation of New York Application August 8, 1930, Serial No. 474,013

12 Claims. (Cl. 175—41)

This invention relates to a high potential capacitor and has for its object to cheapen the construction of such a capacitor.

It has heretofore been customary to provide floating armatures supported from the casing or cover, or from a clamping means, and of course insulated, being floating armatures; but under this invention such supports for the floating armatures are dispensed with and the resultant structure simplified.

The single figure of the drawing illustrates one exemplary embodiment of this invention.

A casing 10 of structural insulating material such as porcelain, or preferably a borosilicate glass known as pyrex, is provided with metal ends 11 and 12 preferably of aluminum and each secured to the casing by cement 13 as is customary. Within the casing are arranged a plurality of spaced armature plates 14, each of which is encased in a combined dielectric and insulating embedment which supports it.

The casing 10 with the ends 11 and 12 attached are generally made up in quantities suitable for use with different types and values of capacitors. In making the embodiment illustrated, it has been found desirable to first place one of the armature plates contiguous to bottom or end member 11. A layer of sulphur is then poured and allowed to cool and solidify at least partially before applying on it the next above armature. This first layer is of a depth substantially as illustrated, by the lowest cross-hatched area, i. e., by the desired distance from the next above armature which is the first floating armature. This bottom armature is supported by bottom metal end member 11 in the position of the assembly shown. The next armature plate 14 is then placed on top of said first partially cooled layer of combined dielectric and embedment 15, so as to be supported thereby exclusively, and a succeeding layer of sulphur poured so as to enclose the newly placed armature and when at least partially cooled and solidified to constitute the exclusive support for a succeeding floating armature.

As shown, the armatures 14 are plates, i. e. armatures of substantial thickness in the sense that they are not of metallic foil as commonly employed; the object here of employing armatures in plate form being to adapt the armatures to the special new method of construction as distinguished from the ordinary stack-building operation of laying mica and flimsy foil sheets alternately on top of one another. This invention is the first instance where the operation of building the stack, pile or column has been performed by the filler-man, i. e., the operative who casts the embedment in the casing around the stack. Here, as above, the filling operation is split up into a plurality of steps between which an armature plate is placed on top of the previously cast and partially solidified dielectric material so that the latter constitutes both an embedment of the stack as a whole, and of each armature, and constitutes the capacitor-dielectric between successive armatures. The armatures in plate form provide substantially stiff members which readily can be manipulated by the filler-man in connection with his work in embedding the stack or column, as distinguished from the ordinary and more delicate process of manipulating flimsy metallic foils in building up a mica foil stack. Among the other advantages of the invention are its elimination of the expense of the usual supporting means for the armatures, and the elimination of dielectric losses due to the presence of such supporting means. Also, and cumulatively, the floating character of these dielectric-supported isolated armatures results in so dividing up the voltage that the capacitor can withstand higher potentials.

While the cross-hatching shown in the drawing has been used to indicate the successively applied layers of combined dielectric and insulating embedment, it will be understood that in the finished article a newly poured layer forms a monolith with the previous partially cooled layer so as to make a substantially homogeneous mass, and so that the floating armatures altho successively applied independently, are embedded in spaced insulated relations in, and exclusively supported by, a monolithic mass of combined dielectric between armatures and insulator of the armatures from one another, said mass not only spacing and insulating the armatures from one another and from the condenser terminals, but constituting the only means holding the armatures in supporting relation with the armature enclosing casing. In the method, the operation is as follows, based on the preferred proposition that the diameter of the armatures is less than the internal diameter of the casing as 10. Each successively applied layer of sulfur or the like is applied while hot and molten, to a previously applied layer only partially cooled, so that the heat in the succeeding layer readily melts a sufficient thickness of the top of the preceding layer to cause integral combination of the two layers, and finally integral combination of all the layers. Each successively applied floating armature is applied while cold, to a previously applied sulfur layer partially cooled as above but solidified sufficiently to support the armature without undue sinking by gravity, while yet being sufficiently warm to be melted partially and readily by the hot succeeding molten layer. But each armature as applied constitutes a partial thermal shield between successive sulfur layers respectively warm and hot, said two sulfur layers adjoining one another only in an annular path around the perifery of the armature, and the armature absorbing heat from the succeeding hot sulfur layer, so that there is no excessive melting of the preceding warm sulfur layer below and supporting the armature sufficient to displace said armature undesirably, but so that the two sulfur layers become a unit by the re-melting of the annular portion of the preceding layer around the perifery of the armature. The absorption of heat by the successively applied armatures permits rapid succession of application of hot molten sulfur layers without excessive melting of preceding warm layers solidified sufficiently to support the floating armatures, it being understood that the term "floating" applied to the metal armatures is used in an electrical and not a mechanical sense. As shown, the bottom of each armature rests on top of a preceding sulfur layer, and the top and sides of each armature are covered by a succeeding sulfur layer. The operation of pouring successive layers is carried out until the desired number of floating armatures have been applied and then a cover 16 of sheet metal is secured in place by screws as illustrated to close the upper end of the capacitor.

While the cover 16 has been shown as dished, it will be understood that this may be of any other convenient shape and preferably of a size suitable to constitute a good heat conductor and function as an end armature for the stack.

Because the end members 11 and 12 are generally castings and somewhat roughened unless an expensive finishing operation is resorted to, it has been found desirable to have the lower armature plate 14 contiguous to end member 11 to compensate for any roughness of the inner surface of the end member 11. The armatures are each rounded on their edges adapting them for high voltage operation and also enabling each armature to be securely keyed to its superposed layer of dielectric and embedment.

Instead of having a separate cover 16, it will be understood that the end member 12 may, if desired, be cemented to the casing after the armatures and embedment have been placed so that the end member 12 may then be similar in construction to the end member 11. Yet another way of making the end member 12 is to make it similar to end member 11 except for the provision of a filling opening for material 15.

What is claimed is—

1. A capacitor comprising a casing of structural insulating material, terminals at each end thereof extending across the ends of the casing, at least one of the terminals constituting an armature, a floating armature in the casing between the terminals and a combined dielectric and embedment within said casing and completely enclosing and exclusively supporting said floating armature.

2. The process of making a capacitor which comprises sequentially molding successive layers of dielectrics, one on top of another, and inserting an armature on each partially cooled layer before applying the succeeding superposed layer.

3. The process of making a capacitor which comprises sequentially molding successive layers of dielectrics, one on top of another, and inserting an armature on the lower layer, partially cooled, before applying the superposed layer completely enclosing the armature between the two layers.

4. The process of making a capacitor which comprises sequentially molding successive layers of dielectrics, one on top of another, inserting an armature on the lower layer, partially cooled, before applying the superposed layer, exclusively supporting the armature upon its partially cooled layer during the application of the succeeding layer.

5. The method of manufacturing a capacitor which consists in pouring into an insulating casing a relatively small mass of molten readily fusible dielectric material, applying on top of said mass a floating armature having a diameter smaller than the internal diameter of the casing, and then applying another relatively small mass of such dielectric material on top of said armature and the preceding dielectric mass.

6. The method of manufacturing a capacitor which consists in successively combining a plurality of layers of hot molten dielectric and floating armatures in a mold holding the molten dielectric, each successive armature being applied after the preceding dielectric layer has been cooled to a state wherein it can serve as the exclusive support for the armature.

7. The method of manufacturing a capacitor which consists in successively combining a plurality of layers of hot molten dielectric and floating armatures in a mold holding the molten dielectric each successive dielectric layer being applied after the application of an armature on a preceding dielectric layer, and being applied to the upper surface of such armature and the upper surface of the preceding dielectric layer periferally of such armature; the succeeding dielectric layer being applied while the preceding layer yet is warm facilitating the formation of a dielectric monolith supporting the armature which they enclose.

8. A capacitor including a casing having two metal end members and a hollow member of insulating material mechanically connected to said end members; a plurality of flat armature disks inside said casing and arranged face to face in parallel relation successively above one another in column but spaced from one another; and a mass of readily fusible dielectric material filling the space between the periferies of the disks and the inside wall of the insulating portion of the casing thereby constituting an embedment of the column of armature disks, said dielectric material also filling the spaces between the successive armature disks and thereby constituting the dielectric of the capacitor; said location of said material around the column of flat disks and between the several disks causing it to surround and completely insulate the individual disks and mechanically support them independently of one another and of the casing.

9. A capacitor including a column of flat armature disks arranged face to face in parallel relation successively above one another but spaced and insulated from one another; a hollow open-ended member of insulating material extending around the sides of the column of disks adjacent the periferies of the individual disks but out of contact therewith; two metallic terminal members mechanically connected respectively to the open ends of said hollow insulating member, one of the terminal members being formed with a filling opening; and a mass of readily fusible dielectric material filling the spaces between the facing armature disks and the spaces between the disks and the wall of the isulating member and supporting and completely insulating the several facing disks of the column.

10. The method of manufacturing a floating armature capacitor which consists in only partially filling a capacitor casing with a molten readily fusible capacitor-dielectric; placing a floating armature with its lower surface lying on top of said dielectric mass when the latter has solidified sufficiently to support the armature in desired position against gravity, thereby obviating need of other support for the armature; and anchoring said armature in said desired position in the casing by placing thereon and on said dielectric mass supporting it a second mass of molten readily fusible dielectric material at an upper level in the casing, and allowing said second mass to solidify and cooperate with the first mass in supporting anchoring and completely isolating the floating armature.

11. A capacitor including a casing having two flat metal end members parallel to one another, and a hollow member of insulating material mechanically connected to said parallel end members; an armature plate of substantial stiffness inside said casing and arranged between, spaced from and face to face and parallel with said parallel metal end members; and a casting of readily fusible dielectric material inside the casing and filling the space between the perifery of the armature plate and the inside wall of the insulating portion of the casing, and filling the spaces on opposite sides of the faces of the armature plate thereby constituting the dielectric of the capacitor and constituting a complete embedment exclusively insulating and mechanically supporting said armature plate.

12. A capacitor including a casing having two metal end members parallel to one another and a hollow member of insulating material mechanically connected to said end members, and a column of armature plates of substantial stiffness inside said casing and arranged between, spaced from and face to face and parallel with said parallel metal end members; and supporting means for said armature plates, consisting solely of a casting of readily fusible dielectric material filling the spaces between the several armature plates and constituting the dielectric of the capacitor and filling the casing between the column of spaced plates and the metal end members and hollow insulating member of the casing, said casting constituting a dielectric monolith enclosed by the casing and embedding the column of spaced plates.

WILLIAM M. BAILEY.